(12) United States Patent
Kamori (10) Patent No.: US 11,077,927 B2
(45) Date of Patent: Aug. 3, 2021

(54) HULL PROPULSION MECHANISM

(71) Applicant: Noriyoshi Kamori, Osaka (JP)

(72) Inventor: Noriyoshi Kamori, Osaka (JP)

( * ) Notice: Subject to any disclaimer, the term of this patent is extended or adjusted under 35 U.S.C. 154(b) by 0 days.

(21) Appl. No.: 17/263,131

(22) PCT Filed: Jul. 31, 2018

(86) PCT No.: PCT/JP2018/028537
§ 371 (c)(1),
(2) Date: Jan. 25, 2021

(87) PCT Pub. No.: WO2020/026322
PCT Pub. Date: Feb. 6, 2020

(65) Prior Publication Data
US 2021/0171176 A1 Jun. 10, 2021

(51) Int. Cl.
| | | |
|---|---|---|
| B63H 23/24 | (2006.01) | |
| B63H 23/26 | (2006.01) | |
| B63H 9/00 | (2006.01) | |
| B63H 13/00 | (2006.01) | |
| B63H 5/125 | (2006.01) | |

(52) U.S. Cl.
CPC ............ B63H 23/26 (2013.01); B63H 9/00 (2013.01); B63H 13/00 (2013.01); B63H 23/24 (2013.01); B63H 5/125 (2013.01)

(58) Field of Classification Search
CPC ........ B63H 23/00; B63H 23/24; B63H 23/26; B63H 9/00; B63H 13/00
USPC .............................. 440/5, 8; 415/4.1, 4.2, 4.4
See application file for complete search history.

(56) References Cited

U.S. PATENT DOCUMENTS

| | | | | |
|---|---|---|---|---|
| 1,459,979 A | * | 6/1923 | Kohn | B63H 13/00 440/8 |
| 1,471,870 A | * | 10/1923 | Tust | B63H 13/00 440/8 |
| 1,491,688 A | * | 4/1924 | Ford | F03D 1/04 440/8 |

(Continued)

FOREIGN PATENT DOCUMENTS

| | | |
|---|---|---|
| CN | 1603615 A | 4/2005 |
| JP | 2001138989 A | 5/2001 |

(Continued)

OTHER PUBLICATIONS

Kamori, N., International Application No. PCT/JP2018/028537, International Search Report, dated Oct. 23, 2018, 5 pages with English translation.

(Continued)

*Primary Examiner* — Lars A Olson
(74) *Attorney, Agent, or Firm* — Rahman LLC (57) ABSTRACT

A hull propulsion mechanism includes a ship body; a wind blade, which is set to the top of the ship body and has a plurality of sails for obtaining a rotating force from wind blade; a shaft, which sustains the wind blade and is a rolling axis as well for conveying the rotating force by the wind blade; a water pump, which is a power unit that circulates water by making use of a turning force from the shaft; and an engine, which obtains hull propulsion from screws that are rotated by a circulated water pressure from the water pump. With this configuration, the hull propulsion mechanism can obtain enough propulsive force without consuming fossil fuels.

8 Claims, 9 Drawing Sheets

(56) References Cited

U.S. PATENT DOCUMENTS

| | | | | |
|---|---|---|---|---|
| 1,650,702 A | * | 11/1927 | Folmer | B63H 13/00 440/8 |
| 2,677,344 A | * | 5/1954 | Annis | B63H 13/00 440/8 |
| 3,212,470 A | * | 10/1965 | Wiggin | B63H 13/00 440/8 |
| 4,353,702 A | * | 10/1982 | Nagy | B63H 13/00 440/8 |
| 6,293,835 B2 | * | 9/2001 | Gorlov | F03D 9/32 440/8 |
| 6,902,447 B1 | * | 6/2005 | Pittman | B63H 13/00 440/8 |
| 7,241,105 B1 | | 7/2007 | Vanderhye et al. | |
| 7,775,843 B1 | | 8/2010 | Vanderhye | |
| 8,038,490 B1 | * | 10/2011 | Vanderhye | B63H 9/00 440/8 |
| 2006/0151664 A1 | | 7/2006 | Yu et al. | |
| 2007/0048137 A1 | | 3/2007 | Hartman | |
| 2008/0008588 A1 | | 1/2008 | Hartman | |

FOREIGN PATENT DOCUMENTS

| | | |
|---|---|---|
| JP | 2006177264 A | 7/2006 |
| JP | 2009067213 A | 4/2009 |
| JP | 2010070155 A | 4/2010 |
| JP | 2011106388 A | 1/2011 |
| JP | 2013002399 A | 1/2013 |
| JP | 2015107794 A | 6/2015 |

OTHER PUBLICATIONS

Kamori, N., International Application No. PCT/JP2018/028537, Written Opinion, dated Oct. 23, 2018, 7 pages with English translation.

* cited by examiner

HULL PROPULSION MECHANISM

CROSS-REFERENCE TO RELATED APPLICATIONS

This application is a 371 national stage application of PCT/JP2018/028537 filed on Jul. 31, 2018, the complete disclosure of which, in its entirety, is herein incorporated by reference.

FIELD OF THE INVENTION

This invention relates to a hull propulsion mechanism, in particular, a hull propulsion mechanism that can obtain enough propulsion without consuming fossil fuel.

BACKGROUND ART

Conventionally, in terms of a hull propulsion mechanism, in most cases, a screw for a fixed-pitch mechanism or a variable-pitch mechanism is set to a rolling shaft. The rolling shaft is rolled by a motor or an internal-combustion engine using fossil fuels so that the hull propulsion is obtained. Consuming fossil fuels as a hull propulsive energy has good thermal efficiency. In particular, C heavy oil, which is dominant for ship fuel, has very poor quality and is cheap. Therefore, this is very convenient for a ship that is operated nonstop.

In terms of conventional hull propulsion mechanism, the most important factor is energy efficiency when a ship moves forward. The mechanism of having less energy consumption with effective propulsion has been studied. For example, the axial flow compression mechanism is disclosed (refer to Patent Reference 1). This mechanism is equipped with a propeller at the inlet of the upstream air intake, a logarithmic spiral blade in the subsequent stage, and an axial flow impeller that compresses air in the subsequent stage. The ship propulsion mechanism, which enhances the propulsion force of the ship without the propeller vortices interfering with each other, is also disclosed (refer to Patent Reference 2).

CITATION LIST

Patent Literature

Patent Reference 1: Japanese Laid-Open Patent Application No. 2015-107794 Publication
Patent Reference 2: Japanese Laid-Open Patent Application No. 2009-67213 Publication

BRIEF SUMMARY OF THE INVENTION

Problems that Invention is to Solve

However, conventional hull propulsion mechanisms still have a fundamental problem, which is consuming fossil fuels such as oil for creating screw propulsion as an energy resource. In particular, recent environmental issues such as global warming stemmed from consuming fossil fuels have become more serious.

Therefore, there is no doubt that the hull propulsion mechanism, which does not consume any fossil fuels and can obtain enough propulsion, has a lot of demands in the future.

The present invention has been made in view of the above-mentioned problems and has an objective to provide a hull propulsion mechanism, which can obtain enough propulsive force without consuming fossil fuels.

Means to Solve the Problems

In order to solve the abovementioned issues, the present invention is a hull propulsion mechanism comprising: a ship body; a wind blade, which is set at the top of the ship body and has a plurality of sails for obtaining a rotating force from the wind blade; a shaft, which sustains the wind blade and is a rolling axis as well for conveying the rotating force by the wind blade; a water pump, which is a power unit that circulates water by making use of a turning force from the shaft; and an engine, which obtains hull propulsion from screws that are rotated by circulated water pressure from the water pump.

In this hull propulsion mechanism, preferably, further comprising: a gear, which is connected to the shaft and transform a turning direction of the turning force from the shaft; and a clutch, which is located between the gear and the water pump, adjusts whether a turning power from the gear will be conveyed to the water pump or blocked.

In this hull propulsion mechanism, preferably, wherein the engine comprising: a housing part, which is fixed to the bottom of the ship body and has a cylindrical shape; a screw, which is situated inside the housing part; and a pipeline for bursting water, which is pumped by the water pump, onto an outer surface of the screw, wherein the screw comprising: a screw drum part, which is a cylindrical part and rotatably fixed to an inner wall of the housing part via bearings; and a fin whose outer side is fixed to an inner wall of the screw drum part and the fin rolls with a rolling movement of the screw drum, wherein the screw drum part, which has a plurality of partitions having a convex shape on a peripheral outer surface and the partitions divide into many sections, wherein the plurality of partitions are arranged parallelly while intersecting a rotating direction of the screw, wherein the water pumped by the water pump is gushed onto the partitions via the pipeline leading the water to the peripheral outer surface of the screw drum part, wherein said water force makes the screw drum part and the fin integrally rotating.

In this hull propulsion mechanism, preferably, wherein the screw is continuously arranged parallelly inside the housing part.

In this hull propulsion mechanism, preferably, further comprising: a cylinder having a cylindrical shape, wherein the other side of the fin consisting of the screw, is inserted and fixed to the cylinder; and a cowling, which extends along a propulsive direction, is set to make seawater flow to the fin.

In this hull propulsion mechanism, preferably, wherein the pipeline comprises a left pipeline, which can gush water to make the screw rotate to the left, and a right pipeline, which can gush water to make the screw rotate to the right.

In this hull propulsion mechanism, preferably, wherein a gushing angle of the left pipeline and a gushing angle of the right pipeline against the screw drum part is to be an acute angle.

In this hull propulsion mechanism, preferably, wherein the screw drum part has drain openings to drain the gushed water from the sections divided by the partitions.

In this hull propulsion mechanism, preferably, further comprising: a power generator unit, which generates electricity by making use of the turning force by the shaft; a storage unit, which storages electricity generated by the power generator unit; a motor unit, which drives the water pump by making use of the electricity stored in the storage unit; an operation unit, which has a function to shift whether the water pump is driven by the motor unit or the turning force from the shaft; and a starting motor, which gives an initial rotating force to the wind blade by using electricity stored in the storage unit when the ship body starts to drive.

Effects of the Invention

A hull propulsion mechanism comprises a ship body; a wind blade, which is set to the top of the ship body and has a plurality of sails for obtaining a rotating force from wind blade; a shaft, which sustains the wind blade and is a rolling axis as well for conveying the rotating force by the wind blade; a water pump, which is a power unit that circulates water by making use of a turning force from the shaft; and an engine, which obtains hull propulsion from screws that are rotated by a circulated water pressure from the water pump. With this configuration, the hull propulsion mechanism can obtain enough propulsive force without consuming fossil fuels.

BEST MODE FOR CARRYING OUT THE INVENTION

Figure 1:
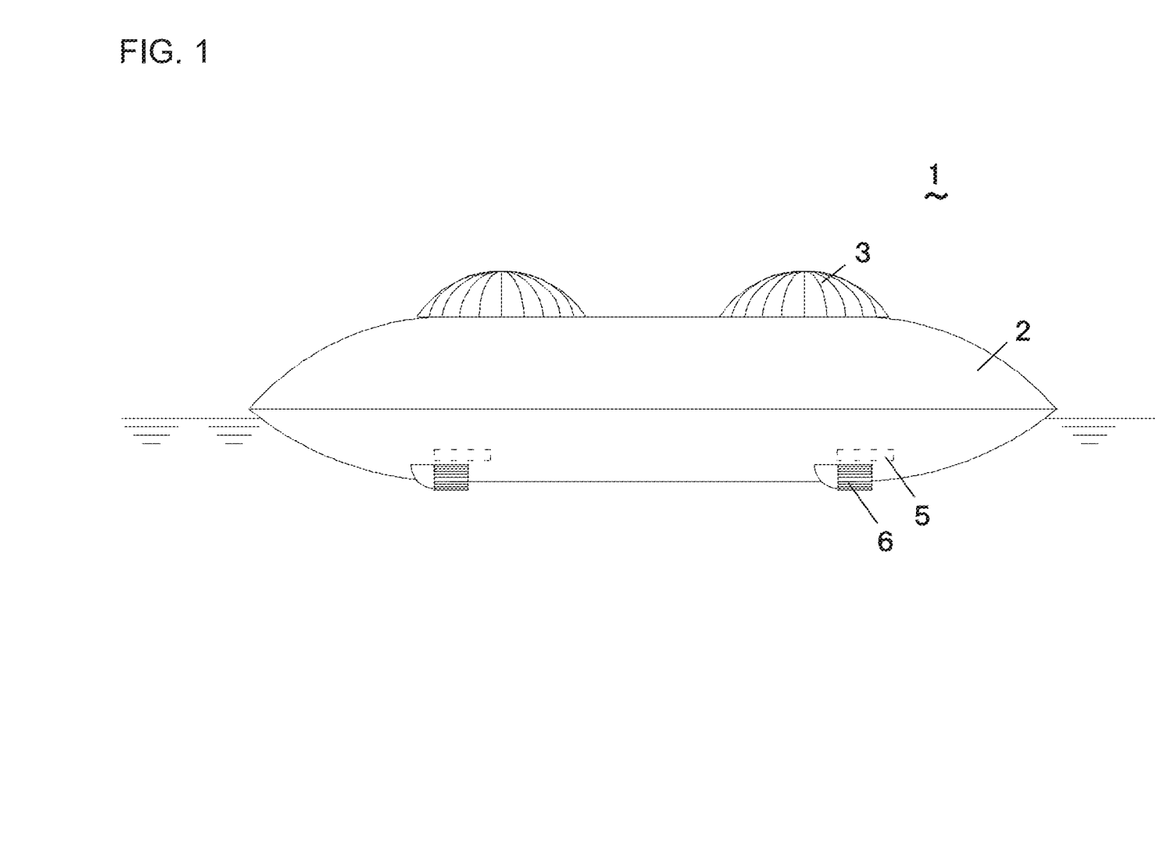
FIG. 1 is a diagram showing the whole structure of a hull propulsion mechanism according to Embodiment.

A hull propulsion mechanism according to an embodiment will be explained by referring to figures. The hull propulsion mechanism shown in FIG. 1 is utilized for a ship such as a container ship, a passenger ship, and so on. The ship does not have engine propulsion that uses fossil fuels. The ship in this invention can obtain propulsion having a unique engine structure that can utilize wind power efficiently.

Figure 2:
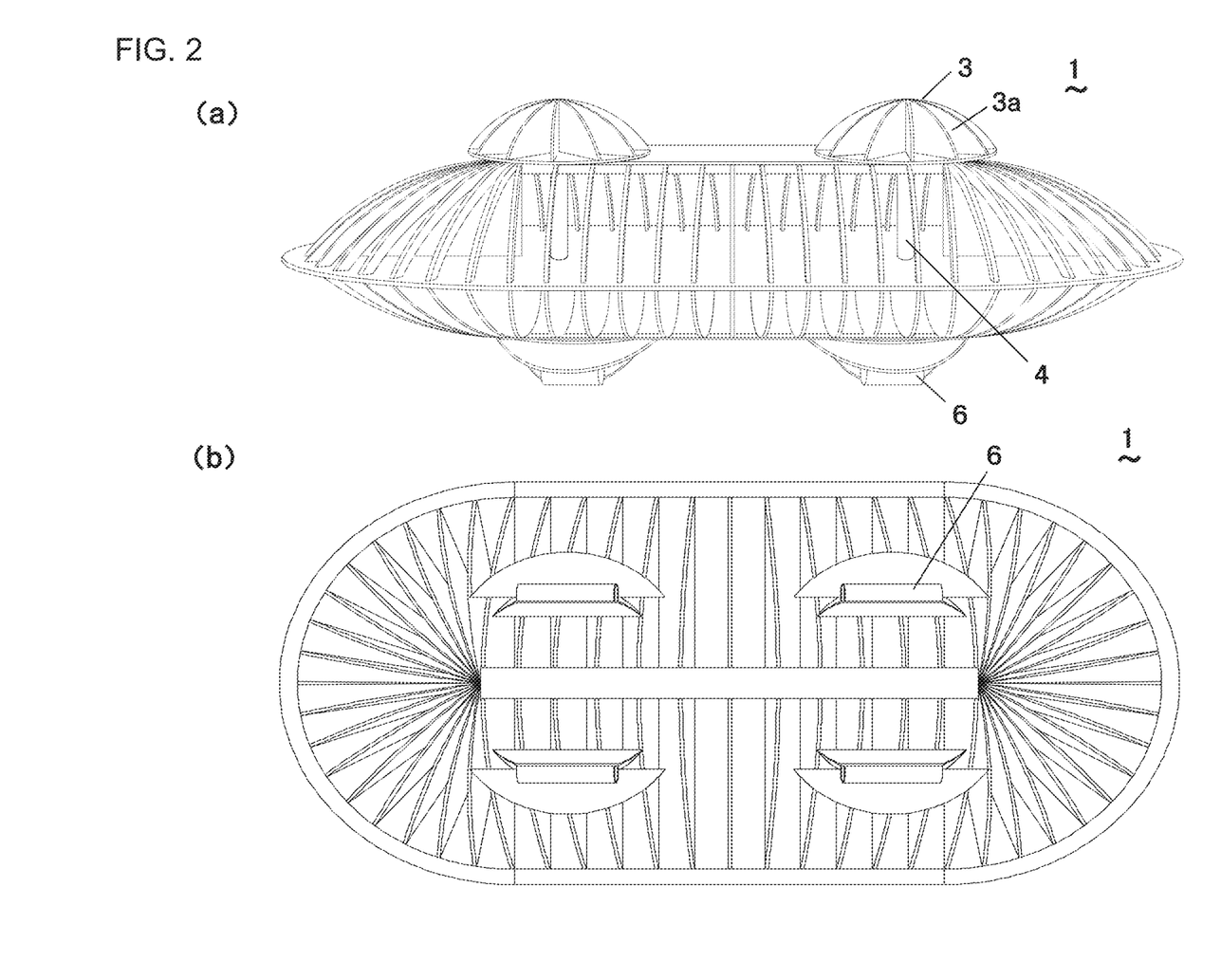
FIG. 2a and FIG. 2b are example diagrams of the hull propulsion mechanism having a skeleton structure.

As shown in FIG. 1 and FIG. 2, the hull propulsion mechanism 1 comprises a ship body 2, which has an unsinkable shape, a wind blade 3, a shaft 4, a water pump 5, and an engine 6.

In fact, the ship body 2 consists of metal (iron) skeleton covered with steel plates shown in FIG. 2. The wind blade 3 is set to the top of the ship body 2 (two parts in this figure) and has a plurality of sails 3a for obtaining a rotating force from wind power. The shaft 4 sustains the wind blade 3 and is a rolling axis as well for conveying the rotating force by the wind blade 3. The water pump 5 is a power unit that circulates water by making use of the turning force from the shaft 4. The engine 6 can obtain hull propulsion from screws that are rotated by the circulated water pressure (high-pressure water current) from the water pump 5. Herein, the pressurized fluid used by the water pump 5 is not limited to water. Another fluid can also be applicable.

The engine 6 is set to the bottom of the ship body 2. The setting location is usually on the rear side of the ship body 2. However, it is possible to be set on the front side of the ship body 2. In particular, when the scale of the ship is huge, it is more effective for the engine 6 to be located on the front side in terms of improving ship handling. In FIG. 2, four engines 6 are set on the bottom of the ship body 2.

Herein, the hull propulsion mechanism 1 according to the embodiment can voyage without a captain. The hull propulsion mechanism 1 can achieve an auto-voyage system with the help of various sensors such as an obstructing detector using GPS (Global Positioning System), infrared rays, a submarine sonar, and so on.

A fossil fuel oriented engine is large and heavy because it requires a fuel tank (ballast). Since this type of engine is not necessary to be equipped, the hull propulsion mechanism 1 can be lightweight. Concretely, the ship body 2 can be completely controlled automatically with the size of L 70 m×W 35 m, Max (height) 13 m, Displacement 7000 t, Maximum load 7500 t, no engine room, and no captain. The propulsive force of the ship body 2 can achieve a voyage with a speed of 20 knots utilizing twenty engines 6 with 2000 mm diameter. Herein, engine design and ship design, which determine the hull propulsion, are various and are not intended to be limited in the above-mentioned design.

Next, the detailed structure of the engine 6 equipped with the hull propulsion mechanism 1 will be explained by referring to FIG. 3 to FIG. 5.

Figure 3:
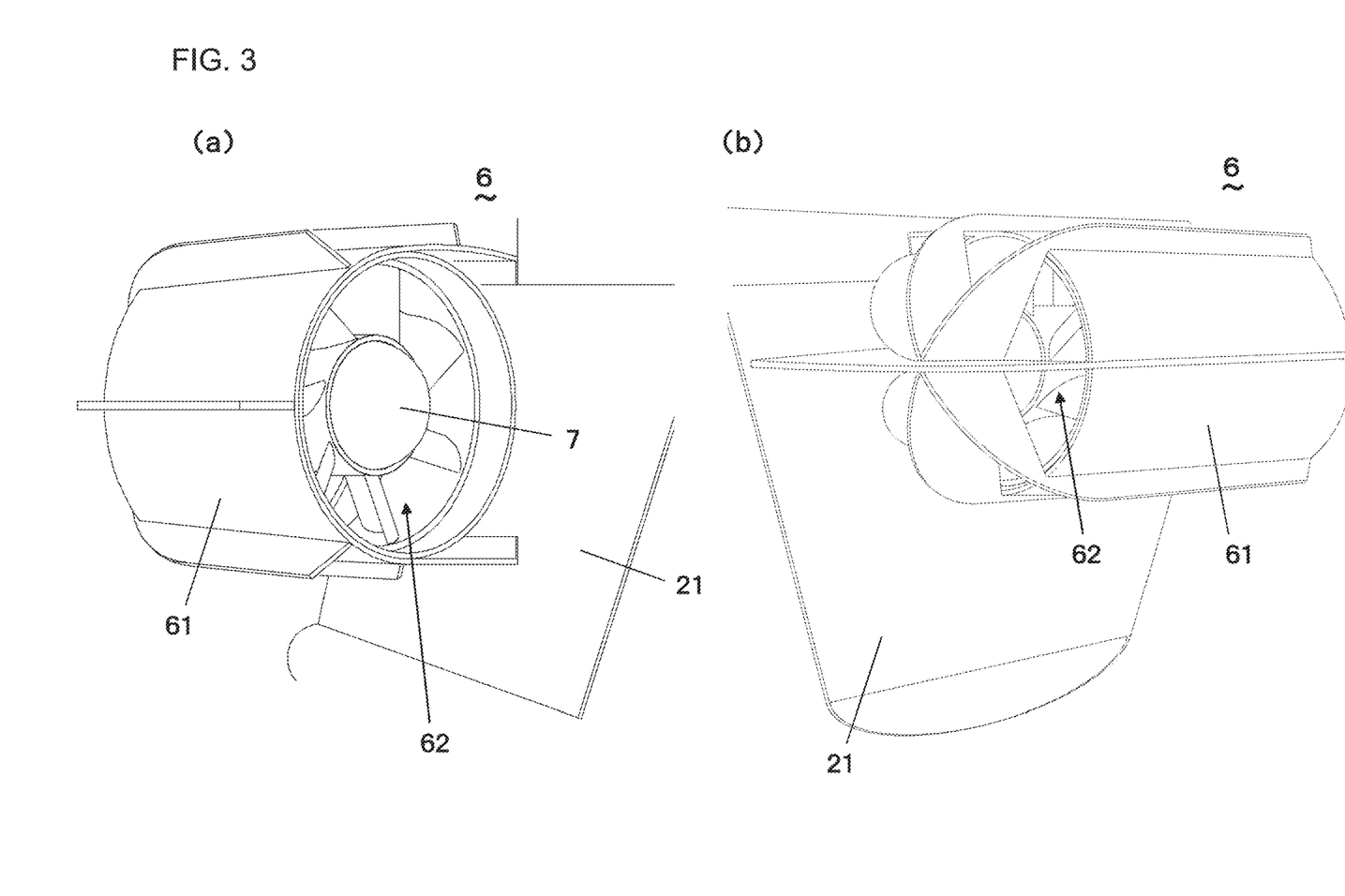
FIG. 3(a) is a front view of an engine attachment structure to a ship body equipped with the hull propulsion mechanism.
FIG. 3(b) is a perspective view of the engine attachment structure to a ship body from the backside.

As shown in FIG. 3, the engine 6 comprises a housing part 61, which is fixed to the bottom of the ship body 2 and has a cylindrical shape, a screw 62 situated inside the housing part 61, and pipelines (not shown in FIG. 3) for bursting water, which is pressed by the water pump 5, onto the outer surface of the screw 62. In other words, the engine 6 has a plurality of screws 62 inside the cylindrical-shaped housing part 61 and is attached to the bottom surface of the ship body 2 using a bracket 21 and so on. The housing part 61 has an opening at the front and back surface to make seawater pass through. The pipelines to circulate water from the water pump 5 are connected to the inside of the housing part 61.

Figure 4:
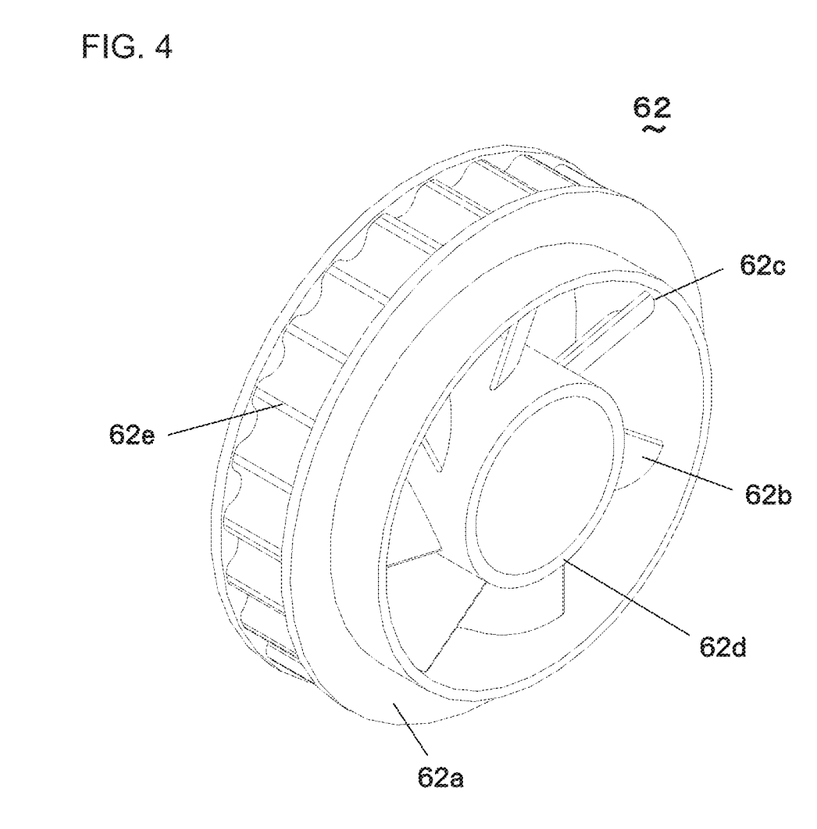
FIG. 4 is a perspective view of a screw equipped with the engine.

FIG. 4 shows a perspective view that shows a detailed structure of the screw 62 equipped inside the engine 6. The screw 62 comprises a screw drum part 62a and a fin 62b. The screw drum part 62a is a cylindrical part and rotatably fixed to the inner wall of the housing part 61 via bearings. More specifically, the screw drum part 62a has a cylinder at the center side and two circle-shaped parts on the outer side of this cylinder. A partition 62e is set at the ditch between these two circular-shaped parts. The outer side of the fin 62b is fixed to the inner wall of the screw drum part 62a and the fin 62b rolls with the rolling movement of the screw drum 62a. It is needless to say that the shape of the fin 62b is not limited to the above-mentioned shape.

More specifically, the screw 62 has a plurality of the fins 62b (in this embodiment eight fins), and the fins 62b are fixed to the inside of the screw drum part 62a. For example, as shown in FIG. 4, the outer side of the fin 62b is inserted into a fixed part 62c, which is a dent formed inside the inner surface of the screw drum part 62a, wherein the dents are shaped according to the shape of the fin 62b. As a result, the fin 62*b* is united with the screw drum part 62*a*. Herein, it is preferable that the fin 62*b* and the screw drum part 62*a* are connected with each other.

In addition, the other (center) side of the fin 62*b* consisting of screw 62 is inserted and fixed to a cylinder 62*d*, which has a cylindrical shape. A cowling 7, which extends along the propulsive direction, is set to make the seawater flow to the fin 62*b*.

As shown in FIG. 4, the screw drum part 62*a* has a plurality of partitions 62*e* having a convex shape on a peripheral outer surface and the partitions 62*e* divide into many sections, wherein the plurality of partitions 62*e* are arranged parallelly while intersecting a rotating direction of the screw 62. As shown in FIG. 5, the water pumped by the water pump 5 is gushed onto this partitions 62*e* via pipeline 51 leading the water to the peripheral outer surface of the screw drum part 62*a*. And this water force can make the screw drum part 62*a* and the fin 62*b* (that is, the screw 62) integrally rotated, and this force will be shifted to the propulsive force in the end. With this configuration, this hull propulsion mechanism 1 can obtain more propulsive forces without spending fossil fuels or with spending much lesser fossil fuels than conventional ships.

Needless to say, there are many other configurations for rotatably fixing the screw 62 inside of the housing part 61. For example, as shown in FIG. 5(*a*), the outer side of the screw drum 62*a* is inserted into a circular dent, which is formed on the inner surface of the housing part 61. At the same time, bearings 63 can lie between the screw drum part 62*a* and the housing part 61. With this configuration, the screw drum part 62*a* is rotatably fixed to the housing part 61. The bearing 63 is located a 0.5 mm unit not only between the front side of the screw drum part 62*a* and the housing part 61, but also between the backside of the screw drum part 62*a* and the housing part 61.

Figure 5:
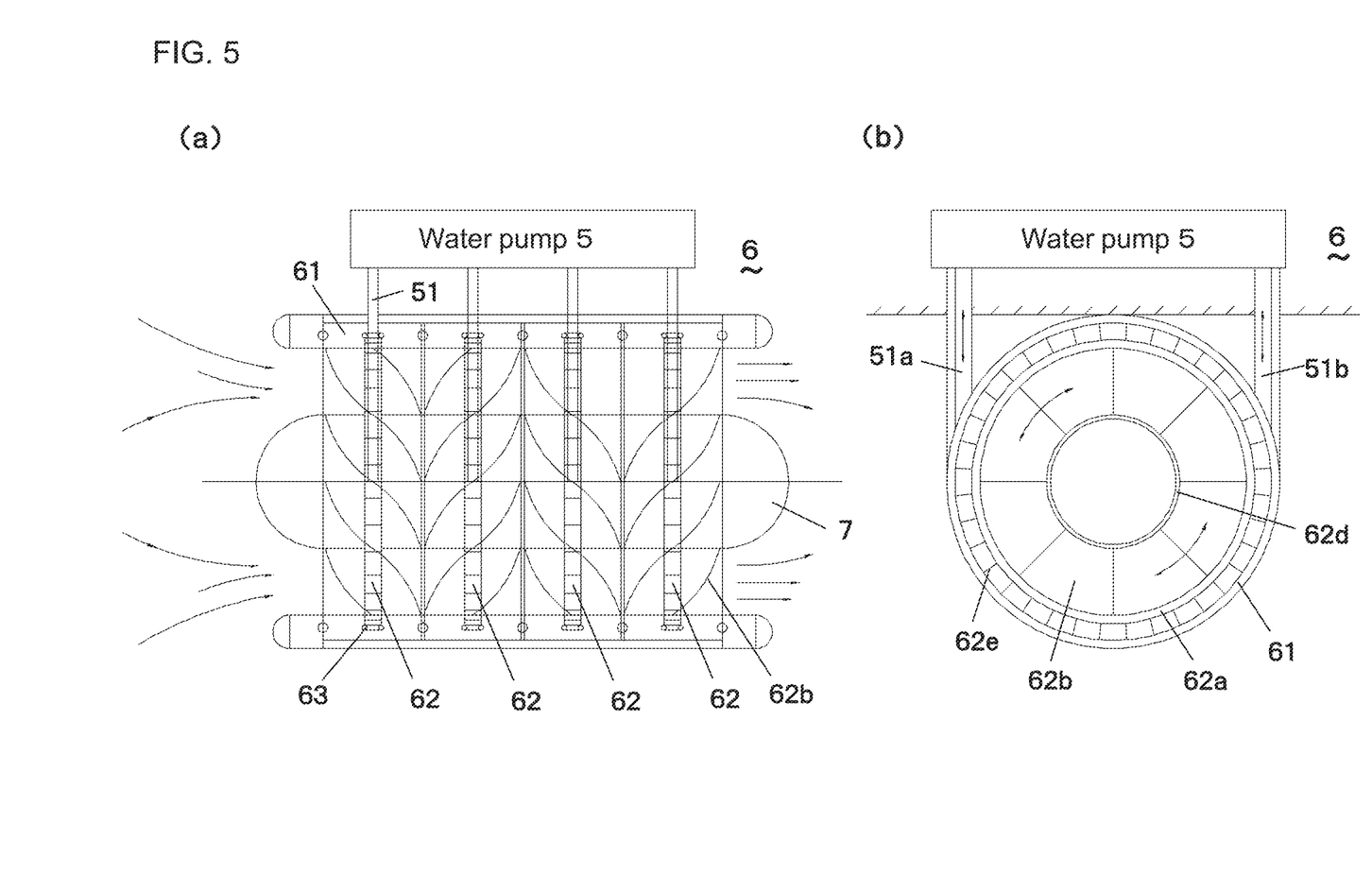
FIG. 5(a) is a side perspective view of the engine.
FIG. 5(b) is a front view of the engine.

Since the water pumped by the water pump 5 is gushed onto the outer surface of the screw drum part 62*a*, as shown in FIG. 5(*b*), the left pipeline 51*a* and the right pipeline 51*b* are equipped. The left pipeline 51*a* can gush water to make the screw 62 rotate to the left against the driving direction of the ship 1. The right pipeline 51*b* can gush water to make the screw 62 rotate to the right against the driving direction of the ship 1. In this embodiment, since the left pipeline 51*a* and the right pipeline 51*b* face each other, the vent of the left pipeline 51*a* has the opposite direction to the vent of the right pipeline 51*b*.

In addition, the gushing angle of the left pipeline 51*a* and the gushing angle of the right pipeline 51*b* should be an acute angle, more preferably, a tangential line to the screw drum part 62*a*. Herein, the acute angle means that the angle between the tangential line and the gushing direction of the water from the pipeline 51 is under 90 degrees, wherein the tangential line is a line towards the peripheral wall of the cylindrical-shaped screw drum part 62*a*. When the water is gushed to the screw drum part 62*a* vertically, it is hard to generate the rotating force of the screw drum part 62*a*. Therefore, by adjusting the angle, it is more effective for the screw drum part 62*a* to obtain rotating force by the pumped water.

Furthermore, the water from the pipeline 51 gushes out to only one said section of the screw drum part 62*a*, and the water generates the rotating force of the partitions 62*e*, wherein the section is the closest to the outlet of the pipeline 51.

Once the screw drum part 62*a* starts to rotate, the gushed water from the pipeline 51 is shifted to the next section, one after another, thus the rotating force onto the screw drum 62*a* will be continuous. Then the gushed water will rotate together within the section of the screw drum part 62*a*, when the water reaches the opposite pipeline 51 part, the water will be blown out from the water circulation of the screw drum part 62*a*.

Herein, a thermoplastic material such as PolyOxyMethylene can be used as the material of the engine 6 and the screw 62. This material has impact resistance and durability and is better for mass production. In particular, due to the small specific gravity (about 1.1), the engine can be much lighter than the conventional engine.

Figure 6:
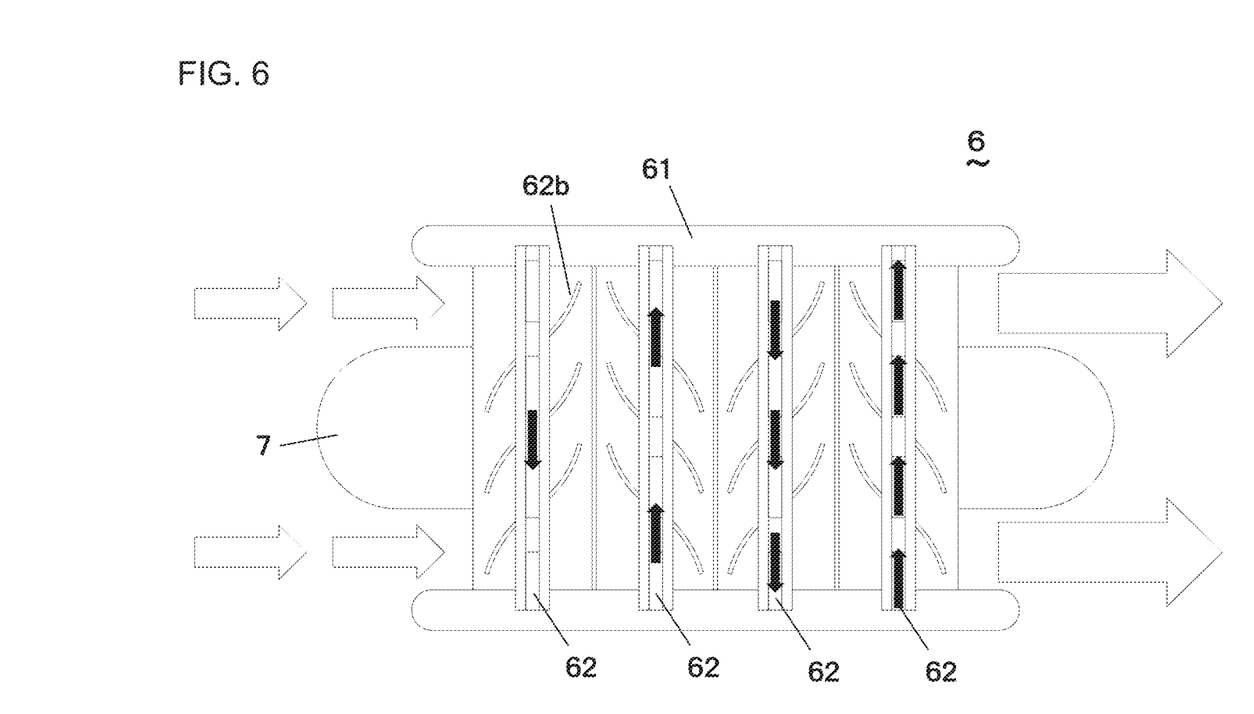
FIG. 6 is an explanatory view of propulsion caused by the engine.
Figure 7:
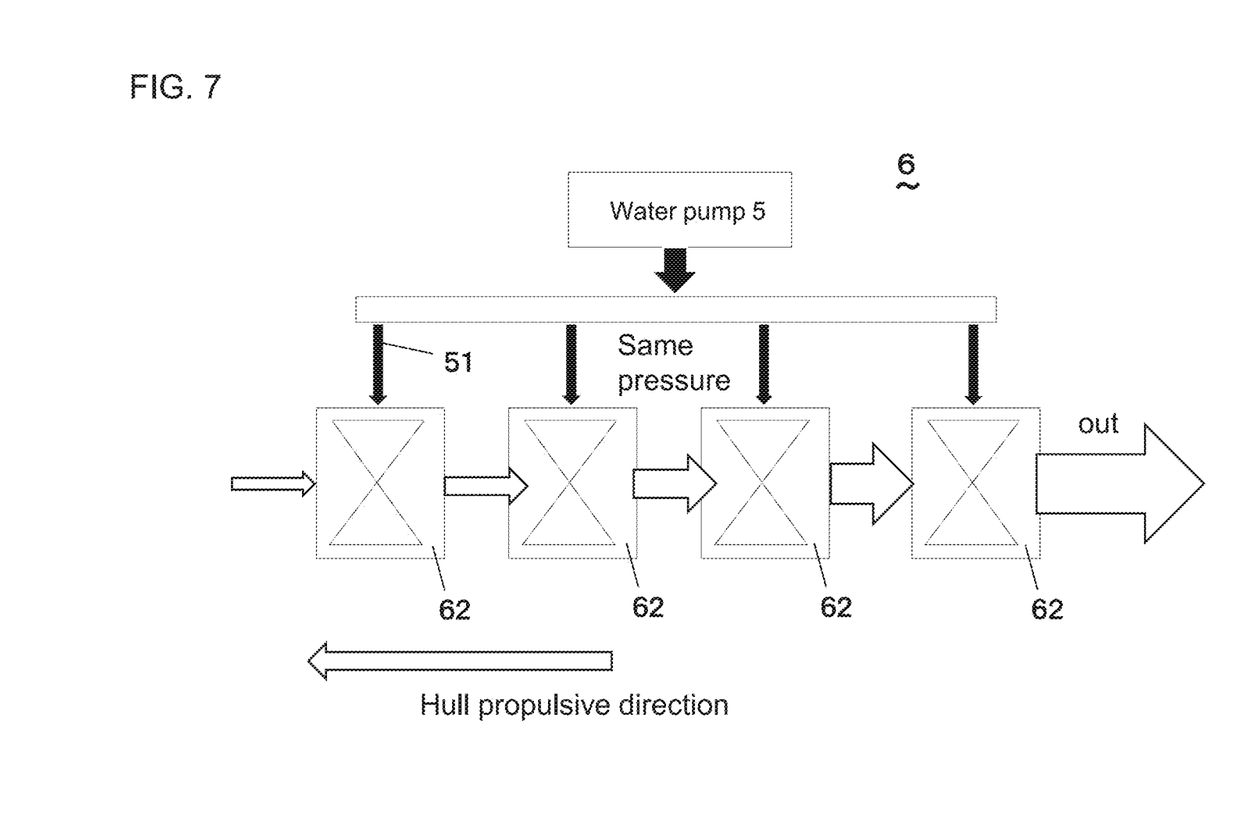
FIG. 7 is a pattern diagram of propulsion caused by the engine.

As shown in FIG. 6 and FIG. 7, the engine 6 has a plurality of the screws 62 inside the housing part 61, wherein the screws 62 are continuously arranged in parallel. The same water pressure by the water pump 5 via the pipeline 51 is pressed on the peripheral outer surface of the screw 62. However, with this configuration, the more backward the screw 62 is positioned, the more rotation speed the screw 62 has. For example, in the case of the four screws 62 shown in FIG. 7, the screw 62 situated backward has 30~50% faster rotation speed. For example, the rotation speed of the screw 62 will become 200 rpm, 300 rpm, 450 rpm, and 680 rpm according to the position. Since the hull propulsion mainly depends on the rotation speed of the most rear screw 62, the ship can obtain larger hull propulsion in the end with a plurality of screws 62 continuously arranged. Herein, the number of the screws 62 is not limited to four as shown in FIG. 5~7. It is feasible to arrange more screws 62 to obtain more hull propulsion. In this case, the hull propulsion can be greater without making the propulsion mechanism (engine) bigger or heavier.

Herein, as shown in FIG. 6, the biased force would occur when a plurality of screw 62 is rotated in the same direction. Therefore, it is feasible for adjacent screw 62 to rotate in the opposite direction from one another.

Figure 8:
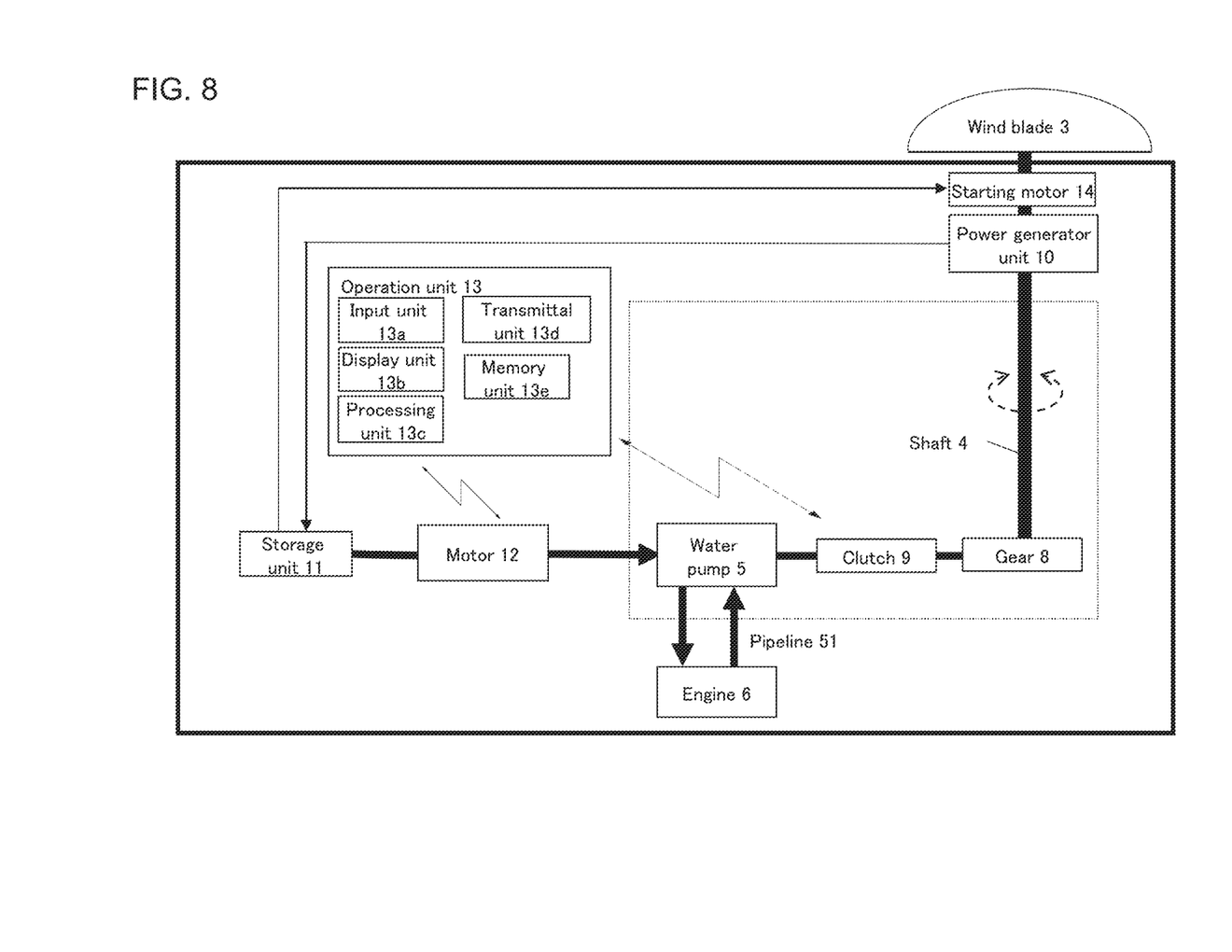
FIG. 8 is a block diagram of the hull propulsion mechanism.

Next, the whole structure (two-way drive) of the hull propulsion mechanism 1 according to the embodiment will be explained by referring to FIG. 8. Except for the above-mentioned structure, the hull propulsion mechanism 1 comprises a gear 8, which is connected to the shaft 4 and transform the power direction from the shaft 4, and a clutch 9, which is located between the gear 8 and the water pump 5 and adjusts whether a turning power from the gear 8 will be conveyed to the water pump 5 or blocked.

In addition, the hull propulsion mechanism 1 comprises a power generator unit 10, a storage unit 11, a motor unit 12, an operation unit 13, and a starting motor 14. The power generator unit 10 generates electricity by making use of the turning force by the shaft 4. The storage unit 11 is such as a lithium-ion cell and storages electricity generated by the power generator unit 10. The motor unit 12 drives the water pump 5 by making use of the electricity stored in the storage unit 11. The operation unit 13 has a function to shift whether the water pump 5 is driven by the motor unit 12 or the turning force from the shaft 4. The starting motor 14 gives an initial rotating force to the wind blade 3 by using electricity stored in the storage unit 11 when the ship starts to drive. For example, in this hull propulsion mechanism 1, the power generator 10 can be two 150 KW generators, and the storage unit 11 can be two DC condenser with 3,000 KW capacity.

Next, the functional structure of the operation unit 13 will be explained by referring to FIG. 8. For example, the operation unit 13 comprises an input unit 13*a*, a display unit 13*b*, a processing unit 13*c*, a transmittal unit 13*d*, and a memory unit 13*e*. The input unit 13*a* accepts instructions (such as speed, the direction of the ship, shifting an engine power source) from a user. The display unit 13b is such as an LCD and displays screens for a user to input the instructions via the input unit 13a. The processing unit 13c is such as a CPU that judges shifting of the engine power source for the water pump 5 based on the water pressure and the wind power information and so on, by utilizing a certain program. The transmittal unit 13d communicates control signals with the clutch 9 and the motor 12. The memory unit 13e is a nonvolatile memory such as ROM and memorizes program for judging the engine power source and so on.

Figure 9:
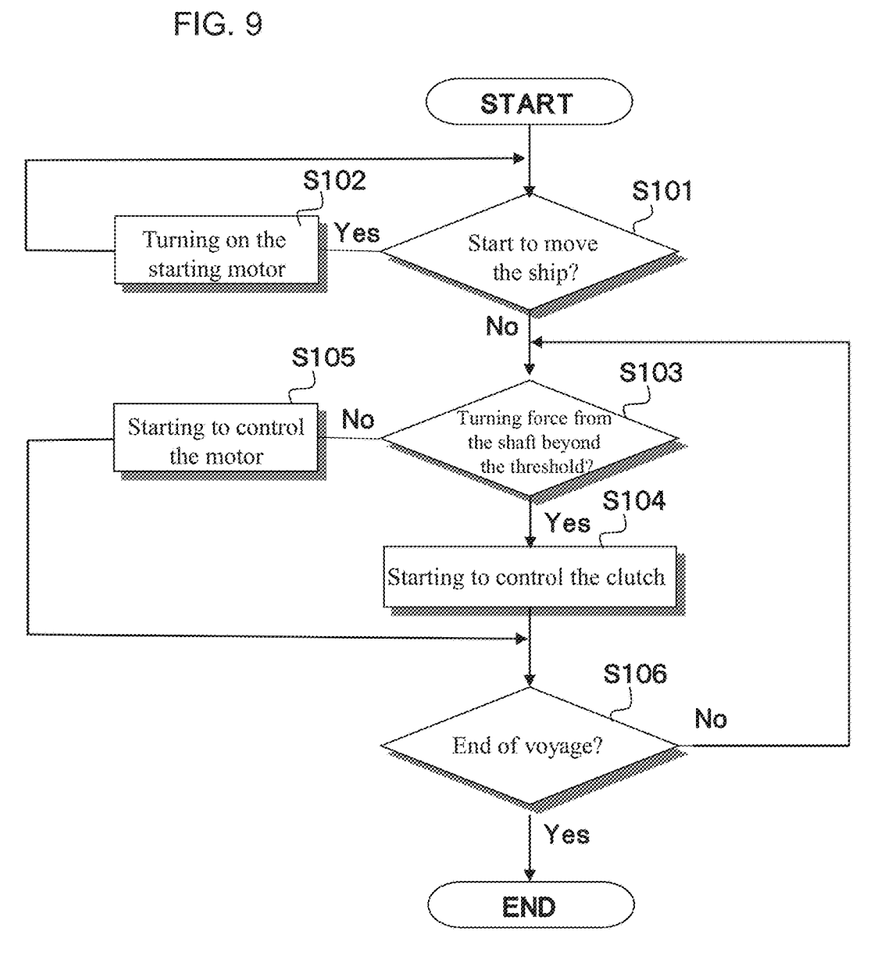
FIG. 9 is a flowchart showing a selection process of the power source for a water pump equipped with the hull propulsion mechanism.

Next, the selection process of the power source for the water pump 5 equipped with the hull propulsion mechanism 1 will be explained as referring to the flowchart shown in FIG. 9.

First, the operation unit 13 judges the moment when the ship body 2 starts to move or not (S101). In the case when the ship body 2 starts to move (Yes in S101), the operation unit 13 turns on the starting motor 14 while the wind blade 3 starts to rotate (S102). On the other hand, in the case when it is not a starting moment (No in S101), the operation unit 13 judges whether the turning force from the shaft 4 is beyond a certain threshold or not (S103).

In the case when the turning force is beyond the threshold (Yes in S103), the operation unit 13 monitors the pressure of the water, which circulates the pumped water between the water pump 5 and the engine 6 while adjusting the clutch 9 to use the turning force from the shaft 5 as the power source. Herein, how to judge whether the turning force from the shaft 4 is beyond the threshold or not is determined based on the water pressure value by using such as a water-pressure detecting unit. On the other hand, in the case when the turning force is below the threshold (No in S103), the operation unit 13 chooses the motor 12 as the power source and adjusts the pressure of the water, which circulates between the water pump 5 and the engine 6. Lastly, the operation unit 13 judges whether the ship on a voyage is continuous using the hull propulsion mechanism 1 or not (S106). In the case when the ship does (Yes in S106), the operation unit 13 repeats the steps from S103. On the other hand, in the case when the ship does not (No in S106), the operation unit 13 stops the control for a hull propulsion. Herein, in FIG. 9, although it is explained that the operation unit 3 uses either one of the shaft 4 or the motor 12 as the power source, it is feasible to use both of them.

As mentioned above, in the hull propulsion mechanism 1 according to the embodiment, high pressed water, which is produced by the turning force from the shaft 4 connected to the wind blade 3, is gushed onto the partition 62e, wherein a plurality of the partition 62e are arranged parallelly on the outer peripheral surface of the screw 62. As a result, the screw 62 can obtain rotating force and the ship body 2 can obtain propulsive force. With this configuration, since it is not necessary to have an internal-combustion engine, the ship body 2 can get enough propulsive force without spending fossil fuels. All required energy in this invention relates to water gushing. Therefore, since the hull propulsion mechanism 1 does not have heat of combustion by fossil fuels, vibration by a piston, and noisy sounds, this mechanism 1 will decrease environmental loads and become an indispensable technology for a decarbonized society.

In addition, the screw 62 is continuously arranged parallelly inside the housing part 61. With this configuration, the more backward the screw 62 is positioned, the more rotation speed the screw 62 has. As a result, it is feasible for the ship body 2 to obtain enough propulsion.

In addition, since it is not required for the hull propulsion mechanism 1 to have an internal-combustion engine and a fuel tank (ballast), the ship body 2 can be very lightweight, spacious, and can increase the load such as a cargo. Furthermore, using resins such as PolyOxyMethylene for the material of the engine 6 can obtain mass production at a cheaper price and economical merits.

Furthermore, since there is no need to have a driveshaft to convey the driving force of the internal-combustion, the screw 62 can be attached to any place on the bottom of the ship body 2. Therefore, the screw 62 can be attached to the most appropriate position according to the ship structure. It is also possible for a plurality of small engines 6 to be attached. In particular, in the case of a big passenger ship, the noise and the vibration from the internal-combustion put stress on the passengers. However, it is possible to mitigate noise and vibration by applying this mechanism.

It is feasible for the ship body 2 to change the direction between backward and forward just by selecting the water flow direction from the pipeline 51. Therefore, it is very easy to control the direction of the ship.

In addition, since the pumped water is gushed on a peripheral outer surface of the screw 62, a cavitation effect, which is caused when pressed air covers the surface of the fin 62b, can be prevented.

In addition, due to this hull propulsion mechanism 1, distribution revolution from land trucks to marine transportation can be realized. Furthermore, many problems relating to current land transportation such as fossil fuels, traffic congestion, freight delay, lack of drivers, and expensive costs can be solved.

(Variation)

A variation according to the embodiment will be explained. In this variation, the hull propulsion mechanism 1 will be a power supply ship. Concretely, the ship body 2 obtains weather information and navigate itself to windy regions automatically by using GPS, a sonar, an obstacle sensor and so on. Next, electricity is generated by the wind blade 3 and the power generator unit 10, and the generated electricity will be stored in the storage unit 11. And the hull propulsion mechanism 1 having enough storage of electricity in the storage unit 11 voyages to a port automatically and supplies the electricity to electric cars, households, and so on. The hull propulsion mechanism 1 can be mass-produced cheaper than before, therefore the hull propulsion mechanism 1 can be a cheaper power resource.

It is to be noted that the present invention is not limited to the above-described embodiments and modified examples, and various modifications are possible within the spirit and scope of the present invention. For example, it is feasible for the screw drum part 62a to have drain openings to drain the gushed water from the sections divided by the partitions 62e. With this opening, the gushed water can be drained from the openings and be efficiently out of the housing part 61 or the screw drum part 62a.

NUMERICAL REFERENCES 1 hull propulsion mechanism
2 ship body
3 wind blade
3 a sail
4 shaft
5 water pump
6 engine
7 cowling
8 gear
9 clutch
10 power generator unit 11 storage unit
12 motor unit
13 operation unit
14 starting motor
51 pipeline
51a left pipeline
51b right pipeline
61 housing part
62 screw
62a screw drum part
62b fin
62c fixed part
62d cylinder
62e partition

What is claimed is:

1. A hull propulsion mechanism comprising:
a ship body;
a wind blade, which is set at the top of the ship body and has a plurality of sails for obtaining a rotating force from the wind blade;
a shaft, which sustains the wind blade and is a rolling axis as well for conveying the rotating force by the wind blade;
a water pump, which is a power unit that circulates water by making use of a turning force from the shaft; and
an engine, which obtains hull propulsion from screws that are rotated by circulated water pressure from the water pump,
wherein the engine comprising:
a housing part, which is fixed to the bottom of the ship body and has a cylindrical shape;
a screw, which is situated inside the housing part; and
a pipeline for bursting water, which is pumped by the water pump, onto an outer surface of the screw,
wherein the screw comprising:
a screw drum part, which is a cylindrical part and rotatably fixed to an inner wall of the housing part via bearings; and
a fin whose outer side is fixed to an inner wall of the screw drum part and the fin rolls with a rolling movement of the screw drum,
wherein the screw drum part, which has a plurality of partitions having a convex shape on a peripheral outer surface and the partitions divide into many sections, wherein the plurality of partitions are arranged parallelly while intersecting a rotating direction of the screw,
wherein the water pumped by the water pump is gushed onto the partitions via the pipeline leading the water to the peripheral outer surface of the screw drum part,
wherein said water force makes the screw drum part and the fin integrally rotating.

2. The hull propulsion mechanism according to claim 1, further comprising:
a gear, which is connected to the shaft and transform a turning direction of the turning force from the shaft; and
a clutch, which is located between the gear and the water pump, adjusts whether a turning power from the gear will be conveyed to the water pump or blocked.

3. The hull propulsion mechanism according to claim 1, wherein the screw is continuously arranged parallelly inside the housing part.

4. The hull propulsion mechanism according to claim 1, further comprising:
a cylinder having a cylindrical shape, wherein the other side of the fin consisting of the screw, is inserted and fixed to the cylinder; and
a cowling, which extends along a propulsive direction, is set to make seawater flow to the fin.

5. The hull propulsion mechanism according to claim 1, wherein the pipeline comprises a left pipeline, which can gush water to make the screw rotate to the left, and a right pipeline, which can gush water to make the screw rotate to the right.

6. The hull propulsion mechanism according to claim 5, wherein a gushing angle of the left pipeline and a gushing angle of the right pipeline against the screw drum part is to be an acute angle.

7. The hull propulsion mechanism according to claim 1, wherein the screw drum part has drain openings to drain the gushed water from the sections divided by the partitions.

8. The hull propulsion mechanism according to claim 1, further comprising:
a power generator unit, which generates electricity by making use of the turning force by the shaft;
a storage unit, which storages electricity generated by the power generator unit;
a motor unit, which drives the water pump by making use of the electricity stored in the storage unit;
an operation unit, which has a function to shift whether the water pump is driven by the motor unit or the turning force from the shaft; and
a starting motor, which gives an initial rotating force to the wind blade by using electricity stored in the storage unit when the ship body starts to drive.

* * * * *